Oct. 9, 1934. R. B. RESPESS 1,976,297
PREPARATION OR REDUCTION OF WOOD OR OTHER FIBROUS MATERIAL
Filed Jan. 15, 1932    5 Sheets-Sheet 4

Fig. 4.

INVENTOR
Roland B. Respess
BY
Marshall & Hawley
ATTORNEYS

Oct. 9, 1934. R. B. RESPESS 1,976,297
PREPARATION OR REDUCTION OF WOOD OR OTHER FIBROUS MATERIAL
Filed Jan. 15, 1932 5 Sheets-Sheet 5

INVENTOR
Roland B. Respess
BY
Marshall & Hawley
ATTORNEYS

Patented Oct. 9, 1934

1,976,297

UNITED STATES PATENT OFFICE 1,976,297

PREPARATION OR REDUCTION OF WOOD OR OTHER FIBROUS MATERIAL

Roland B. Respess, Wickford, R. I., assignor to Respats, Inc., Providence, R. I., a corporation of Rhode Island Application January 15, 1932, Serial No. 586,728

25 Claims. (Cl. 92—26)

This invention relates to the preparation of wood or other fibrous vegetable material for use in making wall or insulating board or like material and to the improved equipment with which the reduction is performed.

The quality or grade of vegetable fiber insulating or wall board is determined largely by certain characteristics, namely, by the strength over weight quotient or strength per unit of weight, by the absorption per unit of weight or density, by its insulating efficiency and its ageing qualities. The strength and the insulating efficiency should be high, the absorption should be reasonably low and its resistance to atmospheric conditions good.

These factors are dependent on the structural characteristics of the board and on the composition of the material utilized in making the board. In many of the processes now in use for preparing or reducing fibrous vegetable material, used in forming wall board or like products, the wood is chemically treated or digested in the presence of a chemical that may materially change the resinous content of the wood and in subsequent treatment it may be entirely removed.

Wood is cooked with chemicals and is subsequently treated to separate the fibers chiefly, so that uniform length of well cleaned fibers may be secured, such as are used in making paper. An illustration of the condition of such fibers, as regards their absorption, is shown in blotting paper and to use such fibers to form denser paper, that resists disintegration in water, it is necessary to add a size, as for illustration, one composed of rosin which serves only to coat the fiber.

To obtain the best grade or quality of wall or insulating board with a low absorption quotient and long lasting qualities substantially all the natural wood ingredients should be retained in the final product, including the natural resinous content of the wood. In other words, the board should be composed of raw or substantially unchanged wood elements.

To obtain the greatest strength with high insulating efficiency in wall board, the original ingredients of the dry wood of the species used should be retained and while a portion of short fibers may be used the main bulk should be composed of comparatively long fibers, flexible strings of interconnected fine fibers or expanded bundles of interconnected flexible stringy fibers, rather than be composed of all short isolated or chemically treated fiber, in which may be, in some cases, included bulks of ground or shredded wood surrounded by such short fiber.

This invention constitutes an improvement on the invention covered by Respess Patent No. 1,770,430, granted July 15, 1930 and has for its salient object to provide an improved apparatus and a continuous process of reducing and expanding fibrous bulks, with full control of the material and quality of reduction, so that subsequent division may be performed to obtain a predetermined classification of the fiber in quality and relative quantity.

Another object of the invention is to provide a process of reducing fibrous material so worked out that the final product may retain substantially all of the resinous content and ingredients of the wood in its natural state when dry.

Another object of the invention is to provide apparatus for reducing wood or fibrous vegetable material so constructed, arranged and worked out that the material will be subjected to controlled intermittent pressing, kneading and smearing action, with successive controlled changing of the positions of the fiber elements relative to each other during such action.

Another object of the invention is to provide a process and apparatus so worked out that the fibrous material can be continuously fed into and withdrawn from the mill and the period of operation on or treatment of the material and the nature and amount of reduction effected in the mill are controllably adjustable.

Another object of the invention is to provide a process and apparatus so worked out and so constructed and arranged that the material acted upon may be controllably segregated from the incoming material and may be continuously withdrawn.

Another object of the invention is to provide a process and apparatus for so treating woody material that its natural raw bulks will be opened up, split, spread, expanded and partially hydrated, whereby subsequent treatment may suitably further divide and hydrate the material to form a mass of soft, flexible raw fiber distinctively different from the chipped, chopped, broken, hard wetted-bulks obtained through use of other processes of reducing uncooked wood.

Another object of the invention is to provide an apparatus for reducing fibrous material so constructed and arranged as to require a minimum amount of power for the work accomplished and, moreover, to accomplish its function in a minimum amount of time.

Another object of the invention is to provide apparatus of the character described so constructed and arranged as to effect the splitting, spreading, smearing, expanding and reduction of the fibrous material without the presence of free water.

Another object of the invention is to provide a process and apparatus for treating fibrous vegetable material so worked out that the moisture in or introduced with the fibrous material operated upon may assist in expanding and dividing the originally compactly placed fibers without unnecessary breakage of the fiber elements and may also assist in furthering subsequent hydration and separation of the fibers in a flexible condition.

Another object of the invention is to provide a process and apparatus for treating fibrous material so worked out as to regulate and maintain a substantially uniform distance and pressure between the coacting surfaces of the rollers and bed plate.

Further objects of the invention will appear from the following specification, taken in connection with the drawings which form a part of this application, and in which.

The invention briefly described consists of a machine comprising a bed preferably in the form of an annular trough having an inclined or curved outer wall and rollers mounted above the trough, preferably on axes offset with relation to each other and arranged to rotate or roll in the trough. The rollers are provided with correspondingly curved or inclined outer end portions and are mounted for free vertical movement and in coaction with the bed or annular trough operate to successively smear, split, spread, knead and expand the material which is positioned between the rollers and the bed. The mill is operated without the use of free water and the action of the rollers on the material in the trough or bed heats up the material thus facilitating the reduction of the fibrous material.

The material is continuously fed into the trough and is continuously withdrawn therefrom, the intake conduit having its outlet end so located as to direct the material against the outer curved or inclined wall of the trough in advance of one of the rollers. Means is provided for gradually guiding the material inwardly toward the axis of the trough and the fibrous material which has been operated upon by the apparatus or mill is withdrawn from the mill at a point adjacent the inner wall of the trough.

Particular attention is directed to the action obtained by the inclined or curved outer edge portions of the rollers acting in conjunction with the inclined or curved outer wall of the trough, since it is principally between these coacting surfaces that the lateral spreading, smearing, and splitting action on the material is obtained.

Furthermore, it should be noted that the action obtained in this apparatus is not in any sense a grinding or abrading action but that the rollers operate successively and with an intermittent action to compress and permit expansion of the material and by the action just referred to effect the spreading and expanding of the fibrous material. This is also aided by the offset relation of the rollers relative to each other and to the axis of rotation of the trough or bed. Due to this feature of the construction the material during the operation of the rollers thereon will be subject not only to a rolling action but to a lateral inward and rearward or slipping action which also tends to split, spread, open up and expand the fibers.

Further details of the invention will appear from the following description.

In the particular apparatus illustrated in the drawings the machine or mill comprises a base 10 having upright portions or pedestals 11. A central upwardly extending substantially cylindrical support 12 is secured to the base and a trough 14 comprising a central bed or portion 15 and inner and outer walls 16 and 17 is mounted on the support 12, roller bearings 18 and 19 preferably being interposed between the trough 14 and the support.

The trough 14 is rotatably mounted on the bearings and can be rotated in any desired manner. In the machine illustrated a bevel gear 20 is secured to the under surface of the base of the trough and meshes with a gear 31 carried by a shaft 32 which in turn is geared to a shaft 33, preferably through a variable speed transmission box 34. The shaft 33 is driven by a motor M.

Particular attention is directed to the construction of the outer wall 17 of the trough 14, this wall having an inclined or curved, concave surface 35, which merges at the lower end with the horizontal or central portion 15 of the trough.

The material in the trough is operated upon by a plurality of rollers, two rollers 40 and 41 being illustrated. Each of the rollers has a cylindrical portion 42 which is disposed above the central or horizontal portion 15 of the trough and has an outer end portion 43 which is inclined or curved to form a surface corresponding to the inclined or curved surface 35 of the outer wall 17.

Figure 3:
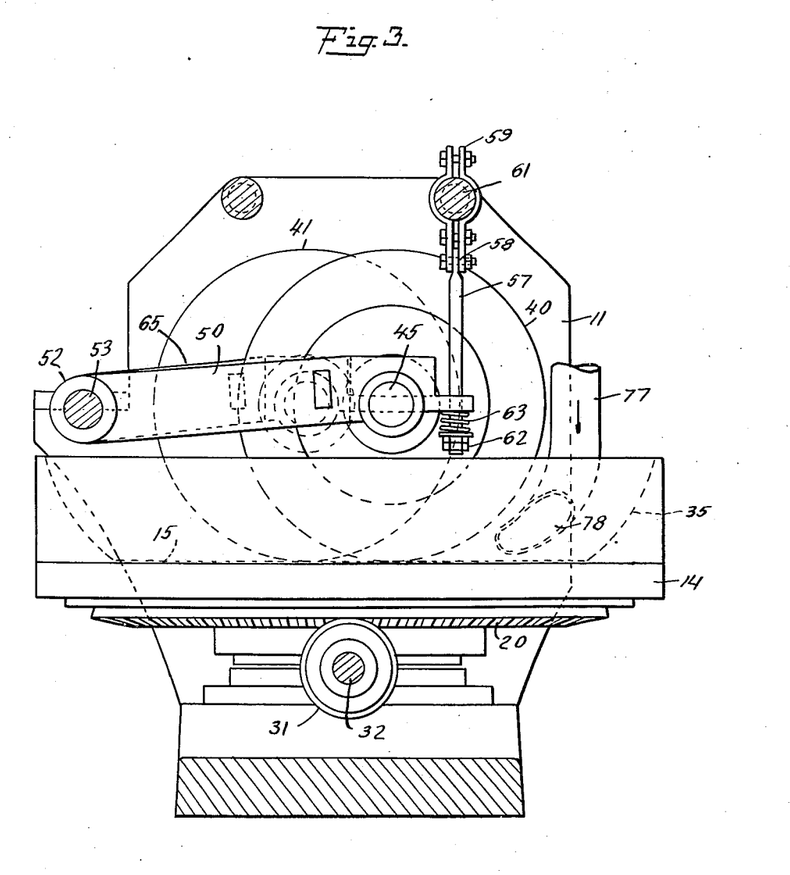
Fig. 3 is a vertical sectional elevation through the machine showing the rollers and supporting and guiding means therefor.
Figure 4:
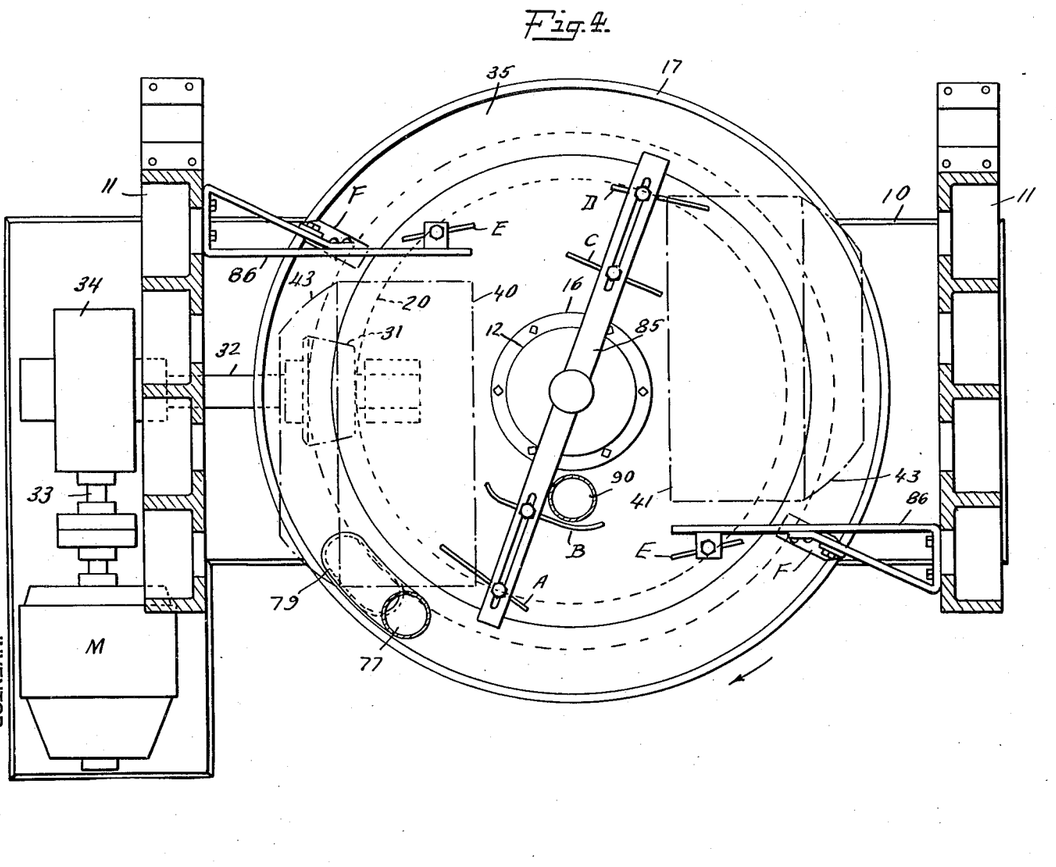
Fig. 4 is a top plan view partly in section of the apparatus or mill.
Figure 5:
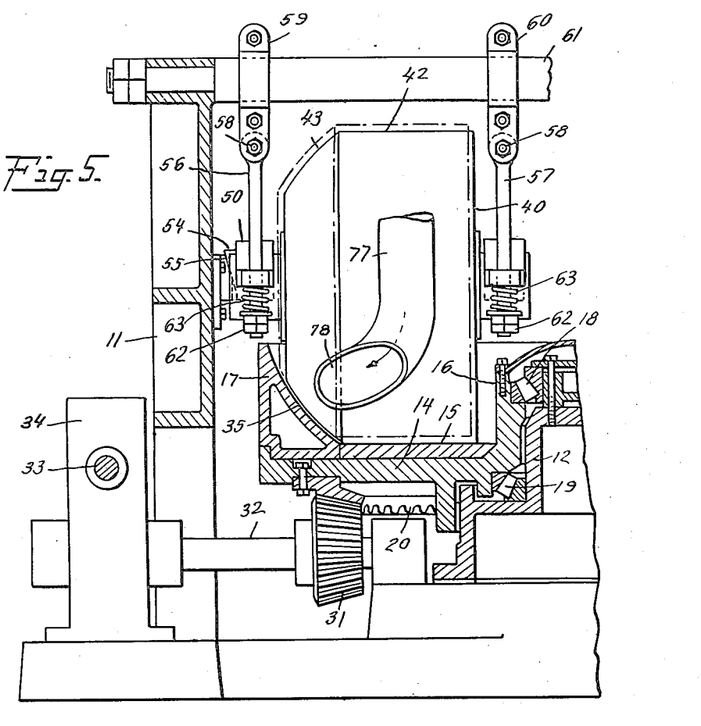
Fig. 5 is a detail, vertical sectional elevation showing one of the rollers, the annular bed or channel and adjacent parts.

The rollers 40 and 41 are mounted for free rotation on axles or shafts 45, and as illustrated particularly in Fig. 3, the axes of rotation of these rollers are offset relative to each other and also relative to the axis of rotation of the trough 14.

The rollers are also mounted in a manner to permit limited, controlled endwise movement, the position of the rollers relative to the annular trough being determined by the amount of material between the rollers and the bed of the trough.

The shaft of the roller 40 is mounted in a pair of arms 50 and 51 which are carried by a sleeve 52 rotatably and slidably mounted on a rod 53 which is secured to and extends between the upright supports or pedestals 11. The arm 50 has secured to the outer face thereof a wedge shaped or inclined block 54 which engages and coacts with a block 55 carried by the adjacent support 11.

The outer ends of the arms 50 and 51 are supported on links 56 and 57 which are in turn pivoted at 58 to clamps 59 and 60 carried by a cross rod 61 connected at its ends to the supports 11. The links 56 and 57 extend through slots in the outer ends of the arms 50 and 51 and are provided at their lower ends with adjustable nuts 62, springs 63 being interposed between the nuts and the lower end surfaces of the arms. The springs have a cushioning effect and prevent the rollers from pounding or violently contacting the bed in case the material acted on is uneven and the rollers are abnormally raised and lowered thereby. The nuts 62 may be adjusted to permit the rollers to just rest on the upper surface of the annular trough or, if desired, they may be adjusted to support the rollers in spaced relation with reference to the trough.

The shaft of the roller 41 is similarly supported in bearings carried by arms 65 and 66 which in turn are mounted on a sleeve 67 slidably and rotatably carried by the cross rod 53. The sleeves 52 and 67 are held resiliently in spaced relation with respect to each other by a spring 68 which encircles the rod 53 and engages the inner ends of the sleeves. The action of the spring through the sleeves and arms coacts with centrifugal force to maintain the wedge shaped guiding blocks 54 and 55 in contact with each other and it will be understood that these wedges are so inclined as to maintain substantially the same spaced relation or distance between the inclined portions of the rollers and trough in all vertical positions of the rollers relative to the trough. In other words, a uniform clearance between these inclined surfaces may thus be maintained.

Figure 6:
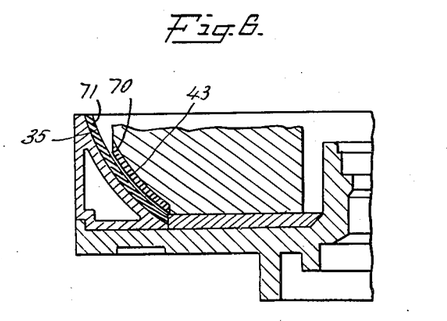
Fig. 6 is a fragmentary sectional elevation showing a slightly modified construction of rollers and bed.

The coacting end surfaces 43 and 35 of the rollers and wall 17 may be formed of metal or, if desired, as shown in Fig. 6, one or both of these surfaces may be lined with resilient material, such as rubber, as indicated at 70 and 71.

Figure 1:
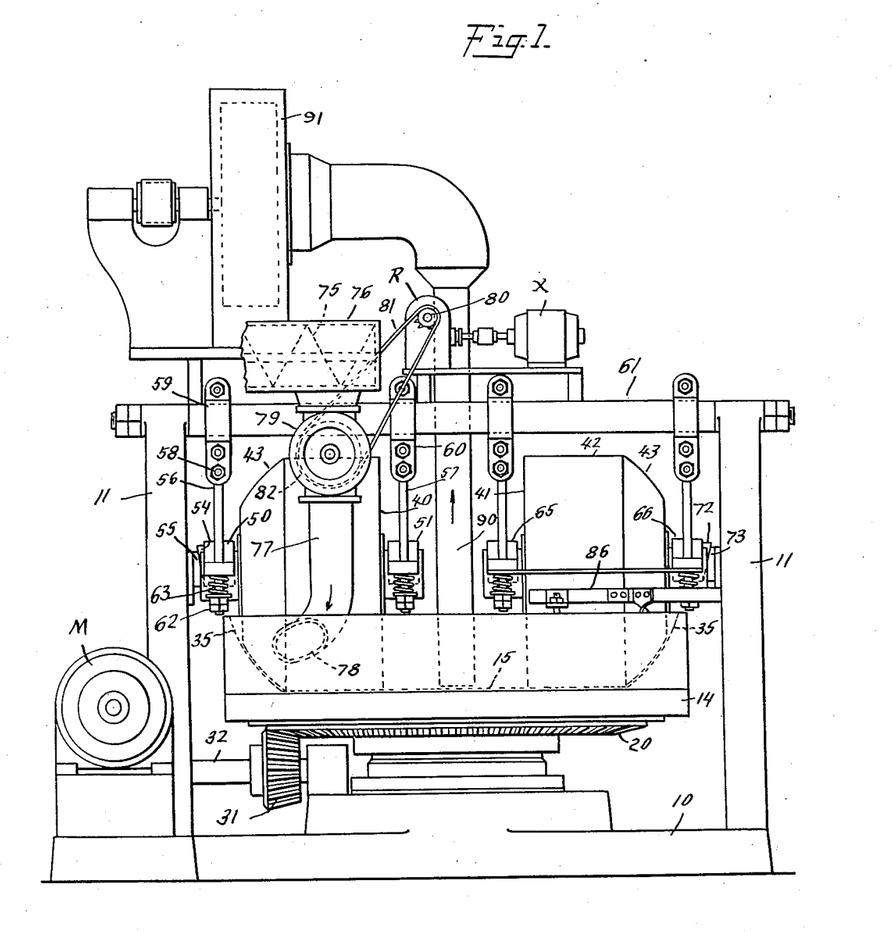
Fig. 1 is an elevational view partly in section of one form of apparatus for carrying out the invention.
Figure 2:
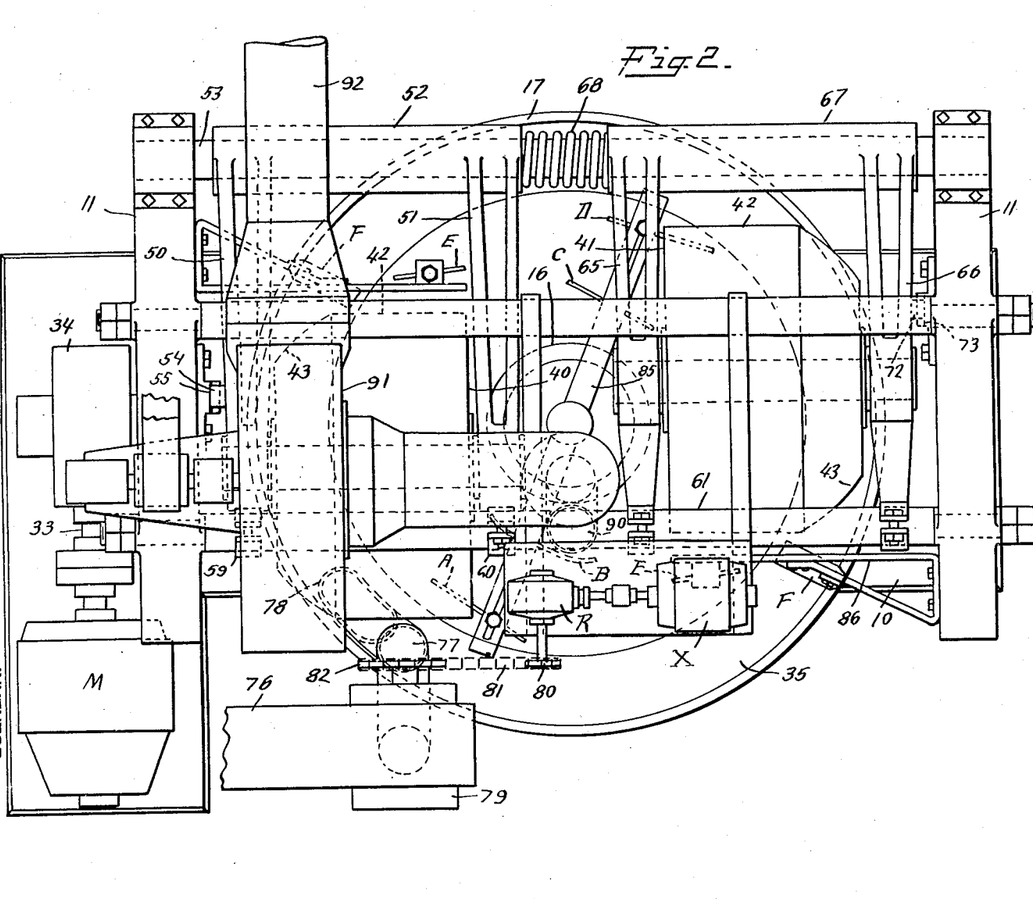
Fig. 2 is a top plan view of the construction shown in Fig. 1.

A shown in Fig. 2, the arm 66 carries a wedge shaped block 72 which coacts with the block 73 mounted on the support 11, these parts acting in the same manner as those above described.

In the operation of the apparatus or mill means is provided for continuously feeding material into the mill, gradually guiding this material toward the axis of rotation of the annular trough and continuously extracting the reduced material from the mill. The material which is fed into the mill consists of moist chipped or shredded wood or other fibrous material. The chips may bed fed by an endless conveyor 75 through a conduit 76 and from this conduit they pass into an inlet pipe 77 having its discharge end or nozzle 78 positioned to direct the material against the outer wall 17 in advance of one of the rollers, as for instance, the roller 40.

The rate of feed of the material into the machine and the rate of withdrawal of the material from the machine are so controlled that a substantially uniform layer may be maintained between the rollers and the bed. In order to control the rate of feed into the machine there is provided an impeller 79 in the pipe 77 which is driven from a motor X through reduction gearing R and a sprocket and chain connection 80, 81 and 82.

It will be obvious that as the material in the trough is being rotated therewith centrifugal force will tend to throw the material outwardly or to maintain it in the outer peripheral portion of the trough. In the particular embodiment of the invention illustrated means is therefore provided for counteracting this movement of the material outwardly and for gradually directing the material toward the center of rotation of the trough. This deflecting means consists of a plurality of vanes or members A, B, C and D which are adjustably mounted on a bar 85 which extends diametrically through the axis of rotation of the trough. The deflectors or vanes A, B, C and D are positioned above the trough and extend closely adjacent thereto, thus engaging the material which is rotated with the bed. These members can be angularly adjusted to accomplish the desired functions and to direct the material as required and it will be evident that the general direction or movement of the material caused by the deflectors will be inwardly away from the outer wall. It is desirable, however, to so direct or deflect the material that it will be sufficiently mixed and reduced before it reaches the zone from which it is withdrawn from the mill. Thus the deflector D is angled to direct the material outwardly, whereas the deflectors A and C direct it inwardly. Furthermore, in order to insure proper mixing and agitation of the material during the reducing operation scrapers E and F are carried by brackets 86 and are positioned to scrape the material or loosen it from the upper surface of the trough.

As above stated, material which has been reduced is continuously withdrawn from the mill. The discharge pipe is shown at 90 and extends downwardly to a position adjacent the inner edge portion of the central bed 15 of the trough, closely adjacent the inner wall 16. The material is sucked upwardly through the pipe 90 by means of a suction pump 91, being discharged from the pump through a pipe 92.

*Operation*

The apparatus above described operates in the following manner: The moist fibrous material to be treated is continuously fed into the mill through the inlet pipe 77 in predetermined amounts to the upper portion of wall 17 of the trough in advance of the roller 40. The bed or trough is rotated continuously to carry the material beneath the rollers 40 and 41. The coacting surfaces 35 and 43 split, smear, knead and spread the fibers and the alternate or intermittent pressure of the rollers and release of the material between the rollers and the trough also aids the kneading and the expansion of the fibers. During this action the moisture becomes evenly and uniformly distributed throughout the material, but as hereinbefore stated, the mill operates on the material without the presence of or use of free water.

The spreading of the fibers is also assisted by reason of the offset relation of the rollers which causes the material to be fed or rubbed laterally and rearwardly during the rotation of the trough or bed. Thus, the moist chipped or shredded wood or fibrous material upon engaging the curved outer wall of the bed is subjected at once to the action of the first roller (40) and is flattened and compressed and forced laterally and rearwardly. The second roller then repeats the operation and successive actions of the rollers gradually force the material downwardly and inwardly in a spiral path to the horizontal portion of the bed.

This pinching, pressing, rubbing, rolling, smearing and kneading action effects the wood bulks in a marked degree, in that the end portions are mashed and spread fan-wise, as if frayed, thus starting a splitting action lengthwise of the grain of the wood and with the intermittent smearing, mixing and kneading action exerted by pressure and release on the material under the wheels, the moist bulks of fiber expand and become soft and flexible so that having already started to split subsequent treatment will separate the fiber to the desired extent, without materially effecting the natural fiber strength of the particular wood species treated.

Furthermore, centrifugal force tends to keep the material in the outer peripheral portion of the trough but this is counteracted and controlled by the deflectors or vanes A, B, C and D and while the material is mixed and turned over by the scrapers E and F. After the material has been guided into the zone of the trough which rotates beneath the suction end of the discharge pipe 90 it will be drawn upwardly and discharged from the mill.

It has been found that the mill or apparatus above described operates effectively to reduce fibrous material to the desired condition without necessitating any chemical treatment for digesting the material. After the material has been withdrawn from the mill it is preferably put through separators by which it is selectively graded and the portion which has been sufficiently reduced is fed directly to storage tanks and the other portions are passed through suitable reducing apparatus or attrition mills.

The process carried out in the manner described has made possible the desired reduction of the material by the use of a minimum amount of power and has, moreover, resulted in the controlled production of fiber of correct length and strength far superior to that produced by processes now in common use for preparing fiber for making wall or insulating board.

Although one specific embodiment of the apparatus and one particular method of carrying out the process have been described it will be understood that the invention is capable of modification and that changes in the process and in the construction and arrangement of the various cooperating parts of the apparatus may be made without departing from the spirit and scope of the invention, as expressed in the following claims.

What I claim is:

1. A reducing mill for fibrous material comprising an annular bed having an upwardly inclined outer edge, rollers disposed above the bed and having correspondingly inclined portions arranged to coact with the bed on the material operated upon, means for feeding material to the mill against the inclined outer edge portion of the bed, and means for withdrawing material from a point spaced inwardly from the outer periphery of the bed.

2. A reducing mill for fibrous material comprising an annular bed having an upwardly inclined outer edge, rollers disposed above the bed and having correspondingly inclined portions arranged to coact with the bed on the material operated upon, means for rotating the bed, means for feeding material to the mill against the inclined outer edge portion of the bed, and means for withdrawing material from a point spaced inwardly from the outer periphery of the bed.

3. A reducing mill for fibrous material comprising an annular bed having an upwardly inclined outer edge, rollers disposed above the bed and having correspondingly inclined portions arranged to coact with the bed on the material operated upon, means for rotating the bed, means for feeding material to the mill against the inclined outer edge portion of the bed, means for withdrawing material from a point spaced inwardly from the outer periphery of the bed, and means for directing and guiding the material inwardly in the bed toward the withdrawing means as it is acted upon by the rollers.

4. A reducing mill for fibrous material comprising a rotatable annular casing, rollers disposed above and arranged to coact with the casing to reduce the material, means for continuously feeding material into the casing adjacent the outer edge thereof, and means for withdrawing material from the casing at a point disposed inwardly toward the center of rotation of the casing.

5. A reducing mill for fibrous material comprising a rotatable annular casing, rollers disposed above and arranged to coact with the casing to reduce the material, means for continuously feeding material into the casing adjacent the outer edge thereof, means for withdrawing material from the casing at a point disposed inwardly toward the center of rotation of the casing, and means for guiding the material inwardly away from the outer periphery of the casing as it is acted on by the rollers.

6. A reducing mill for fibrous material comprising a bed having an inclined wall, a roller rotatable on said bed and movable toward and away from the bed, said roller having an inclined portion coacting with said inclined wall, and means for maintaining a uniform clearance between the inclined surfaces as the roller moves relative to said bed.

7. A reducing mill for fibrous material comprising a bed having an inclined wall, a pair of rollers rotatable on said bed and movable toward and away from the bed, said rollers having inclined portions coacting with said inclined wall, and means for maintaining a uniform clearance between the inclined surfaces as the rollers move relative to said bed.

8. A reducing mill comprising a bed having an upwardly extending outwardly inclined outer wall, a roller arranged to cooperate with said bed and having an inclined end coacting with said wall, and means for feeding fibrous material into the mill against said wall.

9. A reducing mill comprising a rotatable bed having an upwardly extending outwardly inclined outer wall, means for rotating said bed, a roller arranged to cooperate with said bed and having an inclined end coacting with said wall, and means for feeding fibrous material into the mill against said wall in advance of said roller in the direction of rotation of said bed.

10. A reducing mill comprising a bed having an upwardly extending outwardly inclined outer wall, a roller arranged to cooperate with said bed and having an inclined end coacting with said wall, means for feeding fibrous material into the mill against said wall, and means for withdrawing material from the central portion of the mill.

11. A reducing mill comprising a bed having an upwardly extending outwardly inclined outer wall, a roller arranged to cooperate with said bed and having an inclined end coacting with said wall, means for feeding fibrous material into the mill against said wall, means for directing the material toward the center of the mill, and means for withdrawing material from the central portion of the mill.

12. A reducing mill comprising a rotary bed having a substantially horizontal portion and an upwardly and outwardly inclined flange or wall at the outer periphery of the horizontal portion, a plurality of rollers mounted on substantially horizontal axes above said plate, said axes being offset relative to each other and relative to the axis of rotation of the mill, means for feeding material into the mill at a point adjacent said outer wall and in advance of the direction of rotation of the bed, and means for withdrawing reduced material from said mill.

13. A reducing mill comprising a rotary bed having a substantially horizontal portion and an upwardly and outwardly inclined flange or wall at the outer periphery of the horizontal portion, a plurality of rollers mounted on substantially horizontal axes above said plate, said axes being offset relative to each other and relative to the axis of rotation of the mill, means for feeding material into the mill at a point adjacent said outer wall and in advance of the direction of rotation of the bed, and means for withdrawing reduced material from said mill, the withdrawal intake being located adjacent the inner edge of the horizontal portion of the bed.

14. A reducing mill comprising a rotary bed having a substantially horizontal portion and an upwardly and outwardly inclined flange or wall at the outer periphery of the horizontal portion, a plurality of rollers mounted on substantially horizontal axes above said plate, said axes being offset relative to each other and relative to the axis of rotation of the mill, means for feeding material into the mill at a point adjacent said outer wall and in advance of the direction of rotation of the bed, means for withdrawing reduced material from said mill, the withdrawal intake being located adjacent the inner edge of the horizontal portion of the bed, and means for gradually directing the material inwardly toward the axis of rotation of the bed.

15. A reducing mill comprising a rotary bed having an upwardly and outwardly inclined portion, means for rotating said bed, a roller mounted for rotation above said bed and having an inclined portion corresponding to and arranged to coact with the inclined portion of the bed, and means for continuously feeding material into the mill and means extending to a position adjacent the lower portion of the bed for continuously withdrawing material from said mill.

16. A mill of the character described comprising a bed, a roller disposed in cooperative relation to said bed, means supporting said bed and roller for relative rotation, said means including bearings defining a substantially horizontal axis of rotation for said roller, and means yieldingly suspending said bearings above the bed and sustaining a portion of the weight of said roller whereby the effective weight of said roller may vary in accordance with the thickness or amount of material upon the bed.

17. A mill of the character described comprising a bed mounted for rotation on a vertical axis, a roller disposed in cooperative relation to said bed and rotatable about a substantially horizontal axis, means yieldingly supporting said roller and sustaining a portion of its weight, whereby the effective weight of said roller may vary in accordance with the thickness or amount of material upon the bed.

18. A mill of the character described comprising a bed, a roller disposed in cooperative relation to said bed, means supporting said bed and roller for relative rotation about a substantially vertical axis, said means including bearings defining a substantially horizontal axis of rotation for said roller, said horizontal axis being radially offset relative to said vertical axis, and means yieldingly suspending said bearings above the bed and sustaining a portion of the weight of said roller whereby the effective weight of said roller may vary in accordance with the thickness or amount of material upon the bed.

19. A mill of the character described comprising a rotatable bed, a support defining a vertical axis of rotation for the bed, a roller disposed in cooperative relation to said bed, a frame member, arms pivotally mounted on said frame member, bearings mounted on said arms and defining a substantially horizontal axis of rotation for said roller, and resilient means associated with said frame member and arms yieldingly sustaining a portion of the total weight of said roller whereby the effective weight of the roller may vary in accordance with variations in thickness or amount of material upon the bed passing beneath the roller.

20. A mill of the character described comprising an annular bed having an inclined wall, a roller disposed in cooperative relation to said bed, said roller having a conical end corresponding to the inclination of said wall, means for effecting a relative rotation between said roller and bed, a frame member, an arm mounted on said frame member, a bearing mounted on said arm and defining a substantially horizontal axis of rotation for said roller, said arm normally retaining the end of the roller in close juxtaposed relation to the inclined wall of the bed, and means yieldingly urging said roller longitudinally of its horizontal axis of rotation whereby said close juxtaposed relationship may be maintained irrespective of variations in thickness of amount of material upon the bed.

21. A mill of the character described comprising a rotatable annular shaped bed having an inclined wall, a support defining a vertical axis of rotation for the bed, a roller disposed in cooperative relation to said bed, said roller having a conical end corresponding to the inclination of said wall, a frame member, an arm pivotally mounted on said frame member, a bearing mounted on said arm and defining a substantially horizontal axis of rotation for said roller, said arm being movable longitudinally of said horizontal axis, and means for maintaining the end of said roller and said inclined wall in predetermined juxtaposed relation irrespective of vertical movement of said roller.

22. A reducing mill for fibrous material comprising a rotary bed having an inclined portion, a roller disposed above the bed and having a correspondingly inclined portion arranged to coact with the inclined portion of the bed on the material therebetween, means for continuously feeding material into the mill against said inclined portion of the bed and in advance of the roller in the direction of rotation of the bed, and means for continuously withdrawing material from the mill.

23. A reducing mill comprising a rotary bed, speed controlled means for rotating said bed, a roller coacting with the bed to reduce the material therebetween, regulated means for feeding the material to the bed, and means extending to a position adjacent the bed for withdrawing the reduced material from the mill.

24. A mill of the character described comprising a bed having an inclined wall and mounted for rotation on a vertical axis, a roller disposed in cooperative relation to said bed and rotatable about a substantially horizontal axis, said roller having an inclined end arranged to coact with the inclined wall of the bed, supporting means for the roller comprising a slidably mounted, pivoted frame having arms for supporting the roller, and resilient means for moving the frame and roller in a direction toward the inclined wall of the bed.

25. A mill of the character described comprising a bed having an inclined wall and mounted for rotation on a vertical axis, a roller disposed in cooperative relation to said bed and rotatable about a substantially horizontal axis, said roller having an inclined end arranged to coact with the inclined wall of the bed, supporting means for the roller comprising a slidably mounted, pivoted frame having arms for supporting the roller, resilient means for moving the frame and roller in a direction toward the inclined wall of the bed, and means for limiting said sliding movement of the roller supporting frame.

ROLAND B. RESPESS.